United States Patent

[11] 3,621,253

| [72] | Inventors | Robert Bowling Barnes<br>Stamford;<br>Nelson E. Engborg, Greenwich, both of Conn. |
|---|---|---|
| [21] | Appl. No. | 824,130 |
| [22] | Filed | May 13, 1969 |
| [45] | Patented | Nov. 16, 1971 |
| [73] | Assignee | Barnes Engineering Company<br>Stamford, Conn. |

[54] COMBINATION INFRARED AND ISOTOPE SCANNER
4 Claims, 4 Drawing Figs.

[52] U.S. Cl. .................................................. 250/71.5 S,
250/83.3 H, 250/83.3 HP
[51] Int. Cl. ................................................... G01t 1/20
[50] Field of Search ........................................ 250/71.5 S,
83.3 HP

[56]  References Cited
UNITED STATES PATENTS
2,895,049  7/1959  Astheimer et al. ............  250/83.3 HP
3,405,233  10/1968  Anger ..........................  250/71.5 S

*Primary Examiner*—Archie R. Borchelt
*Attorneys*—Joseph Levinson and Robert Ames Norton ABSTRACT: An isotope scanner is provided with an infrared capability by attaching an infrared radiometer on the scintillation probe containing the scintillation detector and using the scanning system of the isotope scanner to simultaneously scan the patient with the radiometer and the scintillation detector. The display equipment of the isotope scanner is utilized simultaneously by the isotope detector and the radiometer to provide a simultaneous infrared and isotope display of the patient under study. The isotope scanner and the infrared radiometer may also be used independently of each other.

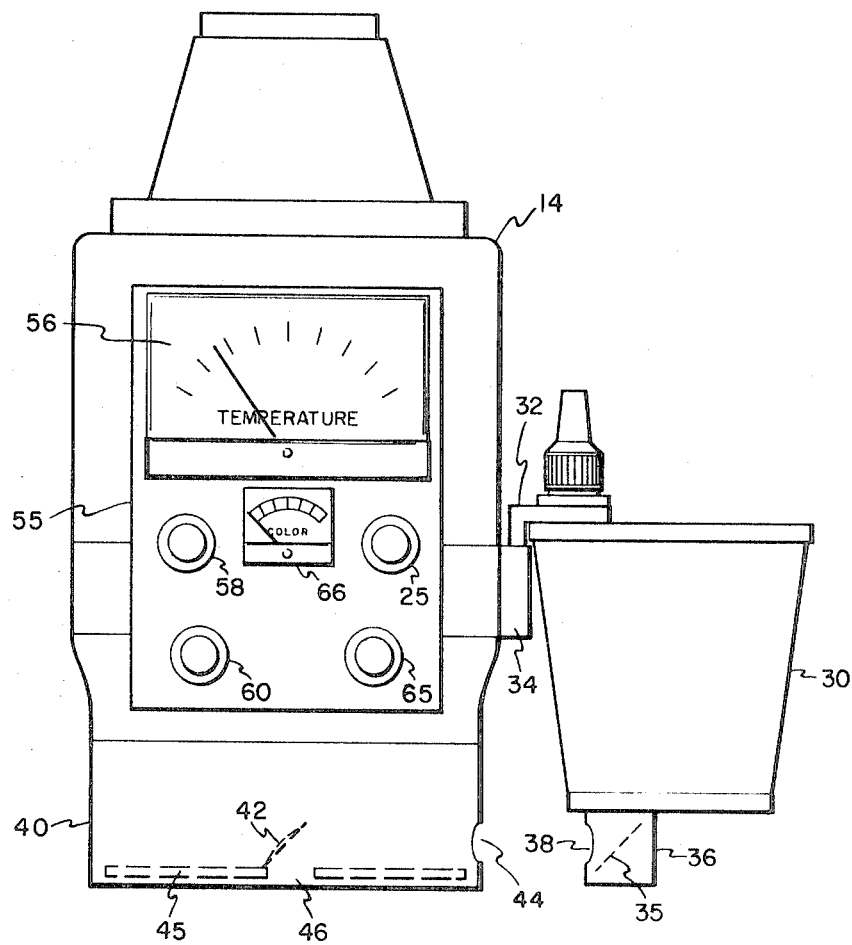
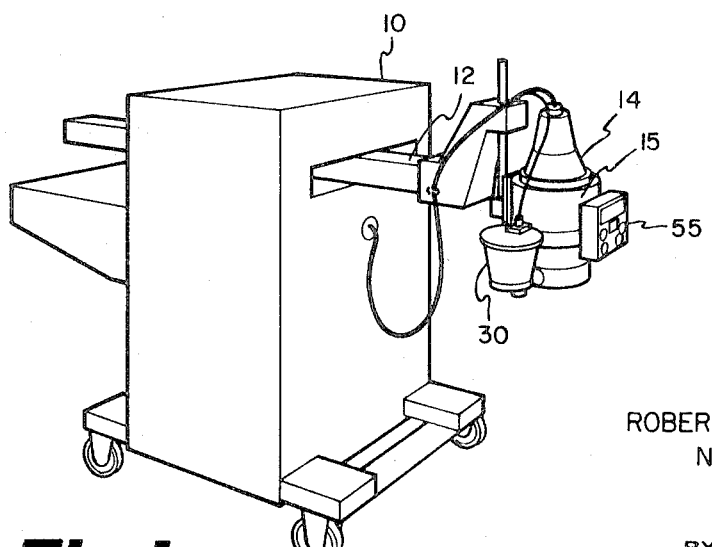

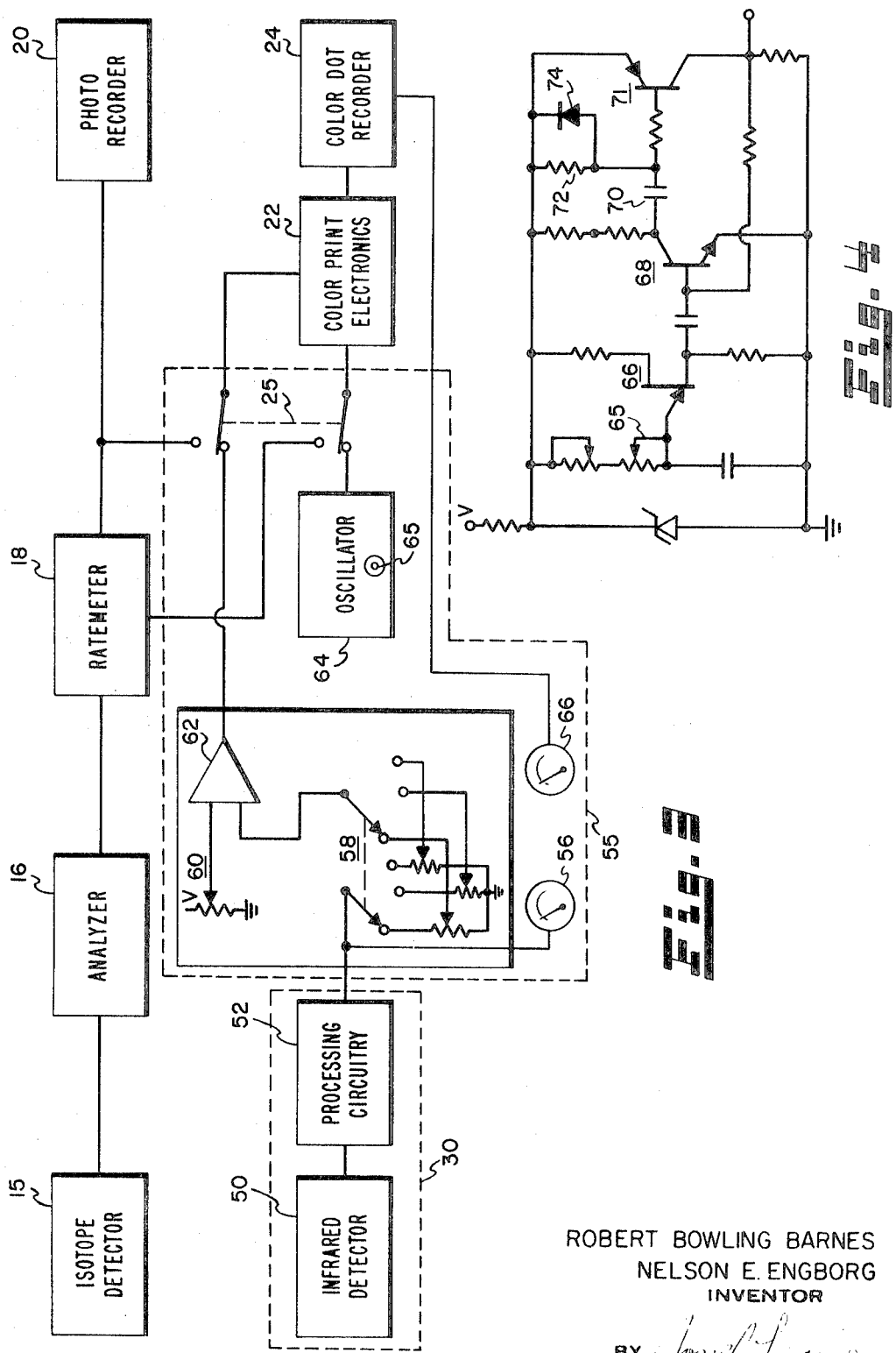

COMBINATION INFRARED AND ISOTOPE SCANNER

BACKGROUND OF THE INVENTION

Medical diagnostic techniques have been evolved utilizing the distribution of radioactive isotopes. The procedure involves the patient being administered doses of radioactive isotopes, and the distribution thereof in the body is scanned, measured and displayed to diagnose malfunctions and malformations of human organs in which the isotopes collect. The isotope scanner includes a scintillation detector which is mounted for controlled scanning across an area of the patient corresponding to the location of the organ under study. The intensity distribution of the radioactive isotopes is detected and displayed on film, either black and white or color, and also by a dot-recording system in which a graph is produced comprising a number of spots with the concentration of spots corresponding to the density of the radioactive material in the body. Many isotope scanners, and most of the newer models, are equipped with color equipment in which the concentration of dots are in color stead of in black and white, instead the X-ray film may also be colored film, which displays provide a color presentation which in some instances are easier to interpret than the black and white displays. In the color dot recording, the intensity of radiation is depicted by colors; for example the intense concentration areas being colored red and those of less intense concentration being displayed in different colors.

Hundreds of the above-described isotope scanners are employed in hospitals and clinics throughout the world. Although they are an invaluable diagnostic tool, isotope scanners are not generally employed for regular examinations, and are therefore not in continuous use. Furthermore, isotope scanners are not employed for diagnosis of certain problems, e.g. breast cancer. It would be desirable to more fully utilize this equipment and extend its diagnostic capability to other areas that are not generally performed by it.

A more recent addition to the diagnostic techniques employing the distribution of radiation from the skin is infrared thermography. Thermography is a method for determining almost instantaneously and at a distance infrared radiation emitted from the human body. The measurement of the infrared radiation can be graphically portrayed on charts or photographic films. It has been found that there is a correlation between external skin temperature and abnormalities below the skin. Malignant tumors, abscesses, cancers, infections, bruises, first degree burns, etc., all elevate the temperature of the skin, whereas frost bite, third degree burns, occluded blood vessels, blocked arteries, ulcers, etc., depress skin temperature. Accordingly, skin temperature can be used as a diagnostic tool. Unlike most radiation diagnostic techniques, infrared procedures require no application of radiation to the patient, but operate passively on the radiation emitted from the body.

It would be most desirable to combine the attributes of the isotope scanners and those of the infrared scanners to provide additional diagnostic information. For example, it would be useful to simultaneously provide an infrared analysis of an area of the body which is under radioactive isotope examination. Additionally, when the isotope scanner is not in use, it would be desirable to extend its use by providing it with an infrared capability. The present invention is directed toward these ends.

SUMMARY OF THE INVENTION

An isotope scanner has an infrared medical thermometer mounted on the scintillation probe of the isotope scanner, which includes the scintillation detector, so that the scintillation detector and the infrared detector scan the same rectilinear pattern of the patient under examination. An interface is also mounted on the scintillation probe so that the infrared medical thermometer provides an output which may be utilized by the visual display equipment of the isotope scanner. Accordingly, the infrared radiometer may be used simultaneously with the scintillation detector of the isotope scanner, or separately, if desired, utilizing the equipment of the isotope scanner.

BRIEF DESCRIPTION OF THE DRAWINGS

FIG. 1 is an isometric view of the combined radiometric and isotope scanner as embodied in this invention.

FIG. 2 is a front view showing the radiometer and its interface mounted on the scintillation probe of the isotope scanner shown in FIG. 1.

FIG. 3 is a schematic block diagram of the combined radiometric and isotope scanner of this invention.

FIG. 4 is a schematic diagram of one form of oscillator which may be used in the schematic of FIG. 3.

DESCRIPTION OF THE PREFERRED EMBODIMENT

The present invention is directed to providing an infrared capability to known isotope scanners. It is of such a character that the infrared equipment can be installed on known isotope scanners without in any way disturbing the functions or operation of such apparatus. The invention will be described with respect to commercially available isotope scanners made by Picker X-ray Corporation, White Plains, N.Y., but is not specifically limited thereto.

Referring now to FIG. 1, there is shown a conventional isotope scanner, referred to generally with the reference character 10, having a scanning mechanism therein (not shown) which drives a movable support or beam 12. The beam 12 on one end carries a scintillation probe 14 which has mounted therein a scintillation detector 15, and is positioned over a patient under examination. The scanning mechanism of the isotope scanner 10 drives the beam 12 and accordingly the scintillation detector 15 in a rectilinear coordinate scan pattern over the subject under examination. As will be seen in FIG. 3, output signals from the scintillation detector 15 are coupled to an analyzer 16 which accepts pulses in the energy region desired to be measured, and which is preset on the instrument before the scanning operation takes place. The predetermination by instrument setting will depend on the type of isotope given to the patient, as well as the organ or part of the body under examination.

The analyzer 16 detects pulses of a characteristic amplitude corresponding to a selected isotope, which in effect rejects scattered radiation, cosmic pulses, and pulses from nearby isotopes not under study. Thus the analyzer 16 produces a formed, constant amplitude pulse, which is repetitive, depending on the amount of the radioactive isotope concentration. The output pulses of the analyzer 16 are fed to a ratemeter 18 which incorporates suitable integration circuits for producing a signal for indicating the counting rate of the pulses from the analyzer 16. Accordingly, the ratemeter 18 provides an integrated output of a voltage analog to counting rate. This output is fed to a photorecorder 20 which photographically records on film a radiation picture of the isotope count. A color presentation can be provided by using color film.

The isotope scanner 10 is generally provided with a multiple form of display, which includes the aforesaid photo recorder 20 and also a dot recorder. The dot recorder may be for either black and white presentation or color presentation. Although not strictly limited thereto, the present invention will be described in connection with the color dot recorder which is particularly advantageous in interpreting infrared displays. As is shown in FIG. 3, the voltage analog output of the ratemeter 18 as well as the counting rate of the ratemeter 18 are fed through a switch 25 in its uppermost position to the color print electronics 22. The color print electronics 22 are connected to a color dot recorder 24. The color dot recorder 24, though not shown in FIG. 1, is mounted on the opposite end of the beam 12 from the scintillation probe 14. Accordingly, the movement of the color dot recorder 24 is synchronized with the scanning of the scintillation detector 15, with the display covering the same area as the scan. The color dot recorder 24 is similar to a typewriter which uses various colored ribbons to indicate different levels of isotope concentration. The ribbon is shifted in accordance with the voltage output of the ratemeter 18, and the concentration of dots is provided by the tap rate from the ratemeter 18. Thus, a visual presentation is provided in the form of a color dot presentation with the intensity of the concentration of the radioactive isotopes being depicted by color.

In accordance with the present invention, as is best seen in FIG. 2, an infrared radiometer 30 is mounted directly on the scintillation probe 14 by a bracket 32 which fits into a cooperating slot in a band 34 on the scintillation probe 14. The infrared radiometer preferred for this application is an infrared medical thermometer model MT-4 manufactured by Barnes Engineering Company, Stamford, Connecticut. The radiometer 30 is provided with a cylindrical barrel 36 having an opening 38 therein and a mirror 35 housed therein. The scintillation probe 14 is provided with a collar 40 having a side opening 44 therein as well as a central opening 46 with a transparent plate 45 carrying a curved dichroic mirror 42. The combination of the dichroic mirror 42 and the mirror 35 boresight the radiometer 30 to the scintillation detector 15 such that the infrared detector in the radiometer is looking at the same spot on the patient as is the scintillation detector 15. The infrared radiometer 30 has an optical system which collects and focuses infrared radiation from the object whose temperature is being monitored onto a thermistor bolometer detector 50 (see FIG. 3). The radiometer 30 also has a motor-driven reflective chopper wheel (not shown) which interrupts the target radiation and reflects radiation from a controlled internal reference source (not shown) onto the detector 50. The detector 50 generates a signal whose amplitude is proportional to the difference in radiation between the target and the internal reference source. The electrical signal from the infrared detector 50 is fed to electronic processing circuitry 52 where it is amplified, rectified, and normally applied to an output meter. In order to utilize the signals from the radiometer 30 to drive the recording apparatus of the isotope scanner 10, a conversion is provided by the interface box 55 which is mounted on the scintillation probe 14. The interface 55 includes on its face (see FIG. 2) a temperature meter 56, a sensitivity control 58, a brightness control 60, a color meter 66, the switch control 25, and an oscillator control 65. As will be best seen in FIG. 3, the output signal from the processing circuitry 52 of the radiometer 30 is fed to the temperature meter 56 to give a direct temperature reading of the skin temperature of the patient under examination. The signal is also applied to a sensitivity control 58 which includes a plurality of potentiometers. The plurality of potentiometers are to apply varying amounts of voltage to an operational amplifier 62. The sensitivity control 58 sets the temperature difference which is to be measured. The brightness control 60 is also fed to the operational amplifier 62 for effectively controlling the range of temperature readings. The operational amplifier 62 amplifies the signals from the radiometer 30 to a sufficient level to drive the color dot recorder 24. Signals from the amplifier 62 are fed through a switch 25 in the position shown in FIG. 3 to drive the color print electronics 22 which in turn drives the dot recorder 24. An oscillator 64 with a tap rate control 65 is provided to also drive the color print electronics 22 and the dot recorder 24. It will be noted that in the position shown for switch 25, the ratemeter 18 which normally drives the color print electronics is not in circuit therewith, which is the purpose of the oscillator 64, to provide a tap rate for driving the dot recorder. Since in the infrared application the only meaningful information is the amplitude of the signal applied from the amplifier 62, the only purpose of the tap rate oscillator 64 is to drive the stylus of the color recorder and the tap rate may be maintained constant. The tap rate of the oscillator will be set in accordance with the rate of scan of the isotope scanner 10, and the oscillator 64 generates a constant amplitude and width pulse at a predetermined tap rate. The interface 55 also contains a color meter which is mounted on the front of the interface, and it is connected to the servoamplifier in the color dot recorder, so that the operator will have some indication of the color being printed for setting the brightness and sensitivity controls when the device is used for infrared recording.

The only requirement for the oscillator 64 is that it have a constant pulse width and amplitude, and any oscillator which performs this function would be suitable. However, merely for purposes of illustration, an oscillator of the type shown in FIG. 4 may be utilized to perform this function. Functionally the circuit operates as a relaxation oscillator. Voltage is applied through an RC network to a unijunction transistor 66. The output of the unijunction transistor 62 is a differentiated spike output. Transistors 68 and 71 are normally nonconducting until the spike is applied to the base of transistor 68. The conduction of transistor 68 due to the presence of the spike from the unijunction transistor 66 discharges a capacitor 70 which turns on transistor 71 while transistor 68 is saturated. The constant pulse width output is taken across the collector of transistor 71 and the pulse width is controlled by capacitor 70 and resistor 72. When capacitor 70 is discharged, transistor 68 shuts off and capacitor 70 is recharged through a diode 74. The result is a constant width pulse output whose frequency is determined by the RC time constant applied to the unijunction transistor 66. As has been stated, any circuit which produces a constant width pulse output may be utilized for the tap rate generator.

With the setup shown in FIG. 3, that is with the switch 25 in the position shown, an infrared capability is provided for conventional isotope scanners. The isotope scanner utilizes the photorecorder 20 while the infrared detector utilizes the dot recorder 24. With color film used in the photorecorder 20, color presentations can be provided both for the isotope scan and the infrared scan. Since the two detectors are scanned simultaneously across the patient, the diagnostician is provided with a visual presentation of both the isotope concentration and a thermal image of the area scanned to aid in his final diagnosis. The isotope scanner 10 can be operated separately by putting the switch 25 in its upper position. Similarly, the infrared radiometer 30 may be utilized separately by merely reading the temperature from the temperature meter 56 or by utilizing the dot recorder 24 with the isotope detector being switched off. By mounting the radiometer 30 on the isotope scanner and utilizing the recording equipment of the scanner, greater utilization of the equipment of the scanner, greater utilization of the equipment is provided when the isotope scanner is not normally in use. Of course when used together, simultaneous presentations are provided. It will be noted that by the present invention the isotope scanner 10 is not altered nor its functions disturbed in any manner, making the addition of the radiometer 30 easy to install and operate.

We claim:

1. A combination infrared and isotope scanner comprising in combination
   a. an isotope scanner having a scintillation detector which is scanned over a predetermined area of a patient under examination,
   b. multiple display means,
   c. electronic circuit means coupled to said scintillation detector and said multiple display means for processing the signals generated by said scintillation detector in response to radioactive isotope distribution in the patient under examination and driving at least one of the said multiple display means to visually display the isotope concentration in the patient,
   d. an infrared radiometer mounted on said scintillation detector for scanning movement therewith such that said radiometer scans the same area as the scintillation detector,
   e. interface means coupled to said radiometer for converting the output of said radiometer for driving at least one of said multiple display means, and f. switch means for coupling said interface to at least one of said display means whereby simultaneously infrared and isotope scans of the patient may be visually displayed.

2. The combined infrared and isotope scanner set forth in claim 1 including means for bore-sighting said scintillation detector and said infrared radiometer whereby identical points may be scanned and displayed simultaneously.

3. The combined infrared and isotope scanner set forth in claim 1 wherein said interface means includes amplifier means to which said radiometer is coupled by a sensitivity control means, said amplifier means also having a brightness control means.

4. The combined infrared and isotope scanner set forth in claim 1 wherein one of said multiple display means comprises a color dot recorder, a tap rate oscillator in said interface, said tap rate oscillator being capable of being connected to said color dot recorder via said switch means.

* * * * *